UNITED STATES PATENT OFFICE.

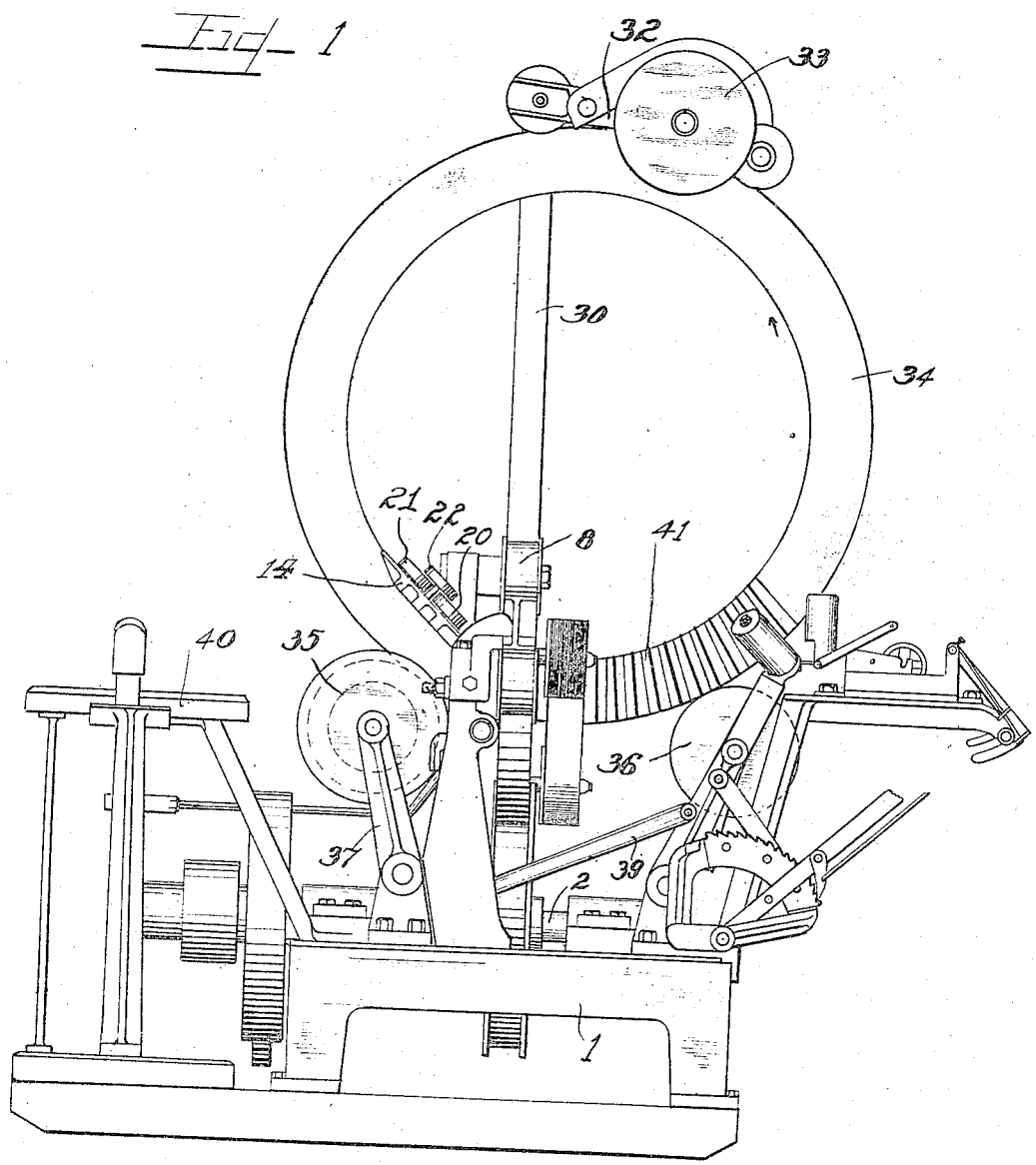

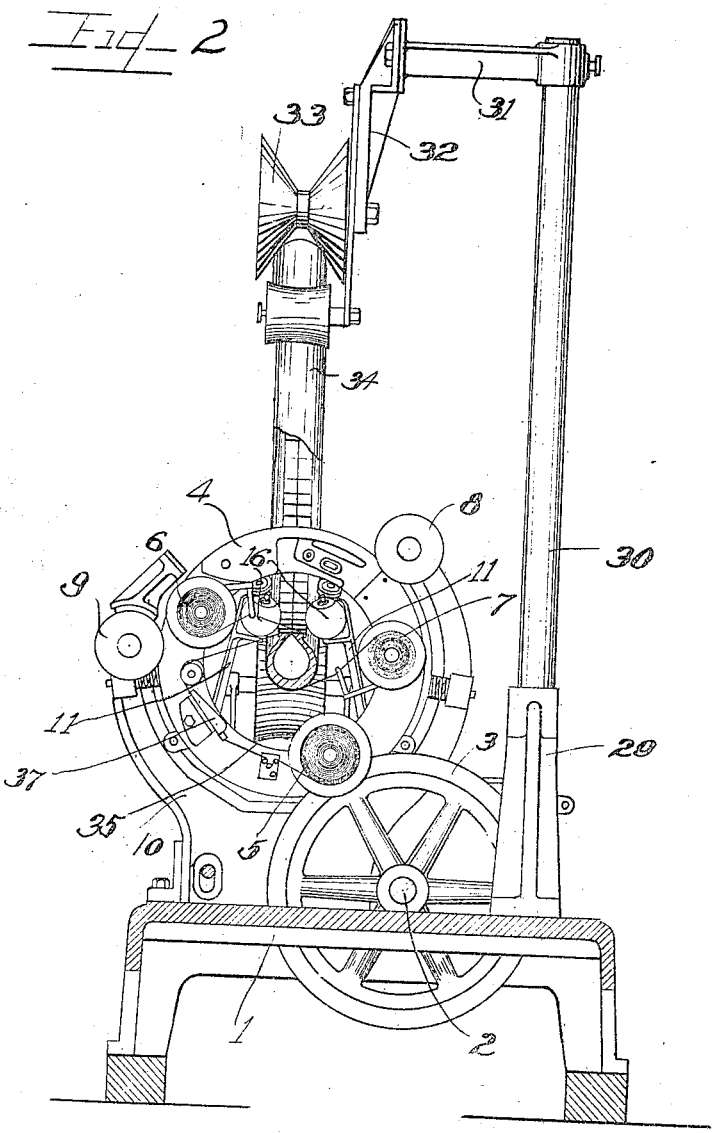

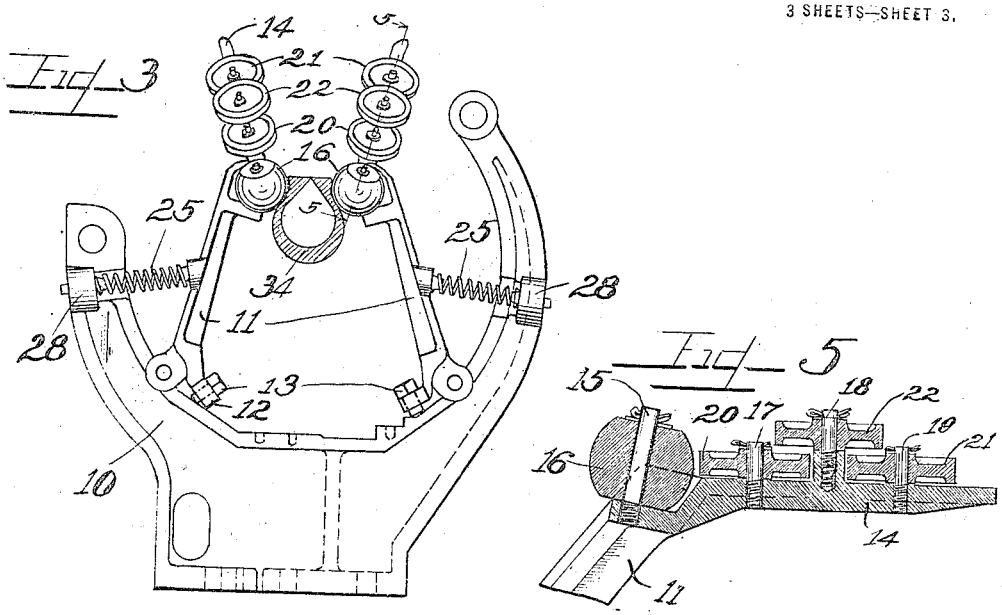
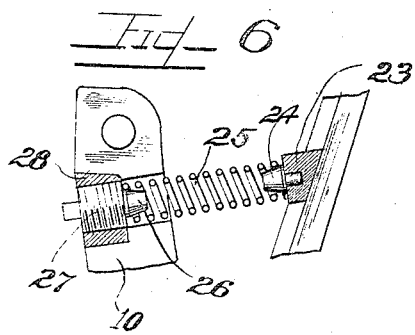
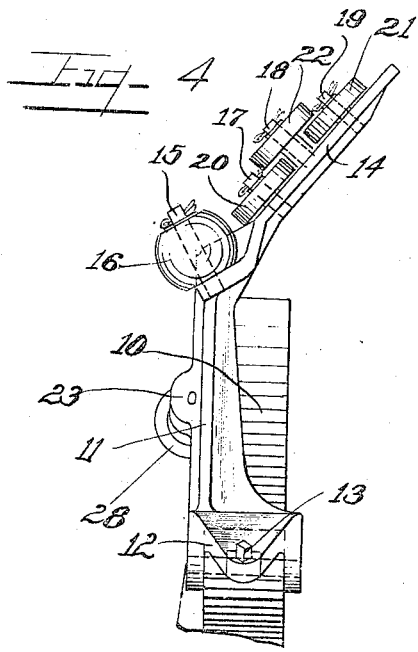

PAUL PIERCE, OF CHICAGO, ILLINOIS.

BEAD-PRESSING AND GUIDE ROLLS FOR TIRE-WRAPPING MACHINES.

1,402,792.

Specification of Letters Patent. Patented Jan. 10, 1922.

Application filed April 29, 1920. Serial No. 377,491.

*To all whom it may concern:*

Be it known that I, PAUL PIERCE, a citizen of the United States, and a resident of the city of Chicago, in the county of Cook and State of Illinois, have invented certain new and useful Improvements in Bead-Pressing and Guide Rolls for Tire-Wrapping Machines; and I do hereby declare that the following is a full, clear, and exact description of the same, reference being had to the accompanying drawings, and to the numerals of reference marked thereon, which form a part of this specification.

This invention relates to an improvement in wrapping machines whereby the beads of tires to be wrapped are held closely toward one another at the time the spiral wrapping is applied. Heretofore, the tension on the wrapping material has been relied upon to accomplish this, which of course necessitated strong wrapping material. If the beads are not brought closely together when the wrapping is applied, subsequent pressure on the tire causes the wrapping to become loose and easily torn. However, if the tire is tightly wrapped with the beads pressed closely together in the first instance, there is slight possibility of injury to the wrapping by rough handling of the wrapped tire.

This invention relates to a means for pressing the tire beads together when the wrapping is applied, a portion of said means serving also to guide the tire into the machine.

It is an object therefore of this invention to provide a guiding and pressing means for a tire when introduced into a tire wrapping machine, to hold the tire properly situated in the machine and to press the beads tightly together at the time the wrapping is applied.

Other and further important objects of this invention will be apparent from the disclosures in the drawings and specification.

The invention (in a preferred form) is illustrated in the drawings and hereinafter more fully described.

Drawings.

Figure 1 is a front view of a tire wrapping machine equipped with a device embodying the principles of my invention.

Figure 2 is an end view thereof with parts omitted and parts shown in section.

Figure 3 is a fragmentary view of one of the frame members of the machine illustrating the guide and presser roll elements.

Figure 4 is a detail end view of one of the presser roll elements.

Figure 5 is a section taken through one of the presser roll elements on line 5—5 of Figure 3.

Description.

The wrapping machine shown in Figure 1 briefly described consists of a base 1 provided with suitable bearings in which a drive shaft 2 is mounted. The drive shaft 2 is provided with a friction driving roll or pulley wheel 3 into which a revolvable shuttle 4 engages, to be driven thereby. Said shuttle carries a reel of paper 5 and two reels of cord 6 and 7 for application with the wrapping as shown in Figure 2. Said rotatable shuttle 4 is not only supported upon the driving friction wheel 3 but also upon idler guide wheels or rollers 8 and 9 respectively, which are mounted on the extremities of a curved U-shaped frame 10 secured upon the base 1. Pivotally mounted on the frame 10 and projecting outwardly and disposed on the opposite side of said frame 10, from the guide rolls 8 and 9, are a pair of arms or levers 11 similar in construction, and each provided with a short extension 12 having an adjusting bolt 13 whereby the amplitude of movement of said arms 11 toward one another is determined. Each of said arms 11 is provided with an angled extension 14, as clearly shown in Figure 5, and journalled on each, on a shaft 15, is a convex roller 16. Secured also on each of the angled extensions 14 are a number of other shafts 17, 18 and 19 respectively, which are parallel to one another but slightly angled with reference to said shaft 15 and the shaft 18 is elevated beyond the shafts 17 and 19. Pivoted upon the shafts 17 and 19 first mentioned are rollers or guide wheels 20 and 21, and journalled upon the shaft 18 is another roller or guide wheel 22 overlapping the wheels 20 and 21, as clearly shown in Figure 3.

Each of the arms 11, as clearly shown in Figures 3 and 6, is provided with a lug 23 having a conical insert 24 therein, and engaged on said lug and over said conical insert is a spiral compression spring 25, the other end of which engages into a recessed portion of the frame and over a conical member 26 forming a part of a threaded insert 27 engaged into an apertured lug 28 of the frame 10. A frame member 29 is secured on the base 1, as shown in Figure 2, and is provided with an upright 30 having on its upper end a bracket 31 to which is secured a pivotal arm 32 carrying a double conical guide roller 33 which, when a tire is placed within the machine, rests thereon, as clearly shown in Figures 1 and 2, the tire being denoted by the reference numeral 34. Said tire 34 is supported upon two driving rolls 35 and 36 respectively, the roll 35 being slightly concave on its surface. The rolls 35 and 36 are mounted on pivotal arms 37 and 38 interconnected by a link 39 and a means is provided for adjusting and holding the same in an adjusted position to bring said rolls 35 and 36 toward or away from one another to elevate or lower the tire according to its size into proper position in the eye of the revolvable shuttle 4. However, since this mechanism forms no part of the present invention, no description thereof is given but attention is directed to the fact that the rolls 35 and 36 are driven by suitable mechanisms from the drive shaft 2 to continuously revolve or rotate the tire 34 through the eye of the shuttle 4 as the wrapping is applied thereon.

As shown in Figure 1, mounted at one side of the wrapping machine is a launching table 40, and the tire 34 is rolled from this table in upright position between the guide rollers 20, 21, and 22, over the roller 35 into position on the rollers 35 and 36 and after moving between the guide rolls 20, 21 and 22, shown in Figure 3, is properly centralized as it drops into position on the rolls 35 and 36 with the beads of the tire pressed against one another by the convex rollers 16.

*Operation.*

The tire to be wrapped is placed in an upright position on the launching table 40 and then rolled therefrom between the rolls 20, 21 and 22 over the roll 35 into position resting upon the rolls 35 and 36 and engaged by the pivotally mounted guide roll 33 resting upon the upper portion of the tire. Upon the tire entering the machine from the launching table 40, it is guided by the pairs of centralizing rollers 20, 21 and 22 which are resiliently mounted on the spring thrust arms 11, and the tire rolls downwardly to wrapping position through the open hinge section of the shuttle 4 which opens in a manner well known. The tire is supported upon the driving rolls 35 and 36 and rotates in a counter-clockwise direction. The presser rolls 16 force the tire beads inwardly toward one another in close relation just before the spiral wrapping is applied. The tight wrapping thus applied serves to hold the beads in this relation and consequently when the tire is completely wrapped, the wrapping cannot become loose, as further compression of the beads toward one another cannot take place. This overcomes the objectionable features of spiral wrappings heretofore encountered when the wrapping was applied upon a tire with the beads not closely pressed together.

I am aware that numerous details of construction may be varied through a wide range without departing from the principles of this invention, and I therefore do not purpose limiting the patent granted otherwise than necessitated by the prior art.

I claim as my invention:

1. The combination with a wrapping machine for annular objects, of pivotally mounted outwardly flaring guiding arms, means for impelling said arms toward each other, and means rotatable on said arms for pressing on the sides of an object after it has been introduced into the machine.

2. The combination with a wrapping machine for annular objects, of outwardly extending means for guiding an object during its introduction into the machine, and means on said guiding means for resiliently engaging the sides of the object after it has been introduced into the machine.

3. The combination with a wrapping machine for annular objects, of resiliently mounted rollers to guide the object upon introduction into the machine to centralize the object, and additional resiliently mounted rollers to press against the sides of the object to hold the same toward one another when the object is in position for wrapping.

4. The combination with a wrapping machine, of arms mounted thereon, rollers on said arms to centralize the object during the projection into the machine, and means on the arms to press the sides of the object to hold the same toward one another when the object is in position for wrapping.

5. The combination with a wrapping machine, and table for feeding objects into the machine for wrapping, of pivotally mounted spring impelled roller devices to guide and centralize an object during introduction into the machine, and pivotally mounted spring impelled roller devices to press against the sides of the object after its introduction into the machine.

6. The combination with a wrapping machine for annular objects, of pivotally mounted arms means impelling the same toward one another, means limiting the movement of said arms toward one another, rollers on said arms to guide and centralize an object during its introduction into the machine, and rollers on said arms to press against the sides of the object to press the same toward one another during the wrapping of the object by the machine.

7. The combination with a frame of arms pivoted thereon, pressing means pivoted on said arms, and guiding means pivoted on the arms outside the pressing means.

8. The combination with a frame of arms mounted thereon, pressing means on said arms, and guiding means on the arms outside the pressing means.

9. The combination with a tire wrapping machine, of means for supporting and rotating a tire to be wrapped, means separate from said supporting means pivoted on the machine and extending inwardly toward the tire, and means freely rotatable on said second mentioned means for pressing the beads of the tire inwardly.

In testimony whereof I have hereunto subscribed my name in the presence of two subscribing witnesses.

PAUL PIERCE.

Witnesses:
CARLTON HILL,
EARL M. HARDINE.